US010641100B2

(12) United States Patent
Auxier et al.

(10) Patent No.: US 10,641,100 B2
(45) Date of Patent: May 5, 2020

(54) GAS TURBINE ENGINE AIRFOIL COOLING PASSAGE CONFIGURATION

(71) Applicant: United Technologies Corporation, Hartford, CT (US)

(72) Inventors: James T. Auxier, Bloomfield, CT (US); Parth Jariwala, Manchester, CT (US); Mark F. Zelesky, Bolton, CT (US); Bret M. Teller, Meriden, CT (US)

(73) Assignee: United Technologies Corporation, Farmington, CT (US)

( * ) Notice: Subject to any disclaimer, the term of this patent is extended or adjusted under 35 U.S.C. 154(b) by 1237 days.

(21) Appl. No.: 14/686,945

(22) Filed: Apr. 15, 2015

(65) Prior Publication Data

US 2016/0090844 A1 Mar. 31, 2016

Related U.S. Application Data

(60) Provisional application No. 61/983,236, filed on Apr. 23, 2014.

(51) Int. Cl.
*F01D 5/18* (2006.01)

(52) U.S. Cl.
CPC ............. *F01D 5/186* (2013.01); *F01D 5/187* (2013.01); *F05D 2250/185* (2013.01); *Y02T 50/676* (2013.01)

(58) Field of Classification Search
CPC .......... F01D 5/186; F01D 5/187; F01D 9/065; F05D 2250/185; F05D 2260/20; F05D 2260/202
USPC ..................... 415/115; 416/96 R, 96 A, 97 R
See application file for complete search history.

(56) References Cited

U.S. PATENT DOCUMENTS

| 5,156,526 | A | 10/1992 | Lee et al. |
| 5,271,715 | A | 12/1993 | Zelesky et al. |
| 5,931,638 | A | 8/1999 | Krause et al. |
| 6,402,471 | B1 | 6/2002 | Demers et al. |
| 7,296,973 | B2 | 11/2007 | Lee et al. |
| 7,413,407 | B2 | 8/2008 | Liang |
| 7,645,122 | B1 | 1/2010 | Liang |
| 7,871,245 | B2 | 1/2011 | Pietraszkiewicz et al. |
| 8,177,507 | B2 | 5/2012 | Pietraszkiewicz et al. |
| 8,303,252 | B2 | 11/2012 | Piggush |

(Continued)

FOREIGN PATENT DOCUMENTS

EP 1793084 6/2007

OTHER PUBLICATIONS

Extended European Search Report for European Application No. 15163567.9 dated Sep. 18, 2015.

*Primary Examiner* — Christopher Verdier
(74) *Attorney, Agent, or Firm* — Carlson, Gaskey & Olds, P.C.

(57) ABSTRACT

A component for a gas turbine engine includes an exterior surface that provides pressure and suction sides. A cooling passage in the component includes a serpentine passageway that has first and second passes respectively configured to provide fluid flow in opposite directions from one another. The first pass includes first and second portions nested relative to one another and overlapping in a thickness direction. The first and second portions are adjacent to one another by sharing a common wall. The first portion is provided on the suction side. The second portion is provided on the pressure side.

18 Claims, 4 Drawing Sheets (56) References Cited

U.S. PATENT DOCUMENTS

| | | |
|---|---|---|
| 8,585,365 B1 | 11/2013 | Liang |
| 2006/0292005 A1 | 12/2006 | Pietraszkiewicz et al. |
| 2007/0128032 A1* | 6/2007 | Lee .................. F01D 5/187 |
| | | 416/97 R |

* cited by examiner

GAS TURBINE ENGINE AIRFOIL COOLING PASSAGE CONFIGURATION

CROSS-REFERENCE TO RELATED APPLICATIONS

This application claims priority to U.S. Provisional Application No. 61/983,236, which was filed on Apr. 23, 2014 and is incorporated herein by reference.

BACKGROUND

This disclosure relates to a gas turbine engine airfoil. More particularly, the disclosure relates to a cooling configuration in an airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Many blades and vanes, blade outer air seals, turbine platforms, and other components include internal cooling passages having a tortuous flow path including turns that provide a serpentine shape, which create undesired pressure losses. Some of the cooling passages may include portions having turbulence promoters that enhance the cooling effects of the cooling flow through the cooling passage.

Gas turbine engines frequently utilize turbine inlet temperatures well beyond the incipient melting point of the component constituent materials due to the push for higher operating efficiencies. To slow or prevent the destruction of hardware, dedicated cooling air is withdrawn from the compressor and used to cool both static and rotating components in the gas path that are at risk of succumbing to damage or failure at elevated temperatures.

When the cooling air is reintroduced into the turbine, significant cycle penalties occur, particularly in the low pressure turbine. Therefore, it is attractive to utilize the extracted cooling air as efficiently as possible to cool turbine components. Both static and rotating components rely on this cooling air. This cooling air has a significantly lower temperature than the walls of the component, which allows for heat to be removed convectively from the walls into the air. A variety of internal features are used to improve the convective heat transfer coefficient as the cooling air flows through the component including, but not limited to: pedestals, impingement ribs, and trip strips. These features, by themselves, are frequently inadequate means of cooling the component, and rely on cooling holes and slots to release the cooling air into the gas path, creating a film to protect the component against the high temperatures of the gas path at the cost of lowered efficiency.

One cooling configuration for efficient use of channel flow heat transfer is a serpentine cooling passage, typically with three or more radial passes through an airfoil creating a circuit. The downside to traditional serpentines is that for blades with larger section widths, a larger-scaled channel size does not carry the same cooling mass flow efficiency as narrower channels.

SUMMARY

In one exemplary embodiment, a component for a gas turbine engine includes an exterior surface that provides pressure and suction sides. A cooling passage in the component includes a serpentine passageway that has first and second passes respectively configured to provide fluid flow in opposite directions from one another. The first pass includes first and second portions nested relative to one another and overlapping in a thickness direction. The first and second portions are adjacent to one another by sharing a common wall. The first portion is provided on the suction side. The second portion is provided on the pressure side.

In a further embodiment of the above, the serpentine passageway includes at least three passes that includes a third pass. The second pass is fluidly connected between the first and third passes. The first pass provides any one of at least three passes.

In a further embodiment of any of the above, the second pass includes third and fourth portions that are nested relative to one another and overlapping in a thickness direction. The third and fourth portions are adjacent to one another by sharing a common wall. The third portion is provided on the suction side. The fourth portion is provided on the pressure side.

In a further embodiment of any of the above, the third pass fifth and sixth portions are nested relative to one another and overlapping in a thickness direction. The fifth and sixth portions are adjacent to one another by sharing a common wall. The fifth portion is provided on the suction side. The sixth portion is provided on the pressure side.

In a further embodiment of any of the above, the first pass is an up pass from a root toward an airfoil tip.

In a further embodiment of any of the above, the serpentine passageway is a three pass configuration.

In a further embodiment of any of the above, the first and second portions are non-quadrilaterally shaped in a chord-wise direction.

In a further embodiment of any of the above, the first and second portions are substantially triangularly shaped in a chord-wise direction.

In a further embodiment of any of the above, at least one of the first and second portions are semi-circularly shaped in a chord-wise direction.

In another exemplary embodiment, a gas turbine engine includes compressor and turbine sections. An airfoil is provided in one of the compressor and turbine sections. The airfoil includes an exterior surface that provides pressure and suction sides. A cooling passage in the airfoil includes a serpentine passageway that has first and second passes respectively configured to provide fluid flow in opposite directions from one another. The first pass includes first and second portions nested relative to one another and overlapping in a thickness direction. The first and second portions are adjacent to one another by sharing a common wall. The first portion is provided on the suction side. The second portion is provided on the pressure side.

In a further embodiment of the above, the serpentine passageway includes at least three passes that includes a third pass. The second pass is fluidly connected between the first and third passes. The first pass provides any one of the at least three passes.

In a further embodiment of any of the above, the second pass includes third and fourth portions nested relative to one another and overlapping in a thickness direction. The third and fourth portions are adjacent to one another by sharing a common wall. The third portion is provided on the suction side. The fourth portion is provided on the pressure side.

In a further embodiment of any of the above, the third pass fifth and sixth portions are nested relative to one another and overlapping in a thickness direction. The fifth and sixth portions are adjacent to one another by sharing a common wall. The fifth portion is provided on the suction side. The sixth portion is provided on the pressure side.

In a further embodiment of any of the above, the first pass is an up pass from a root toward an airfoil tip.

In a further embodiment of any of the above, the serpentine passageway is a three pass configuration.

In a further embodiment of any of the above, the first and second portions are non-quadrilaterally shaped in a chord-wise direction.

In a further embodiment of any of the above, the first and second portions are substantially triangularly shaped in a chord-wise direction.

In a further embodiment of any of the above, at least one of the first and second portions are semi-circularly shaped in a chord-wise direction.

In a further embodiment of any of the above, the airfoil is provided in the turbine section.

In a further embodiment of any of the above, the airfoil is a turbine blade.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
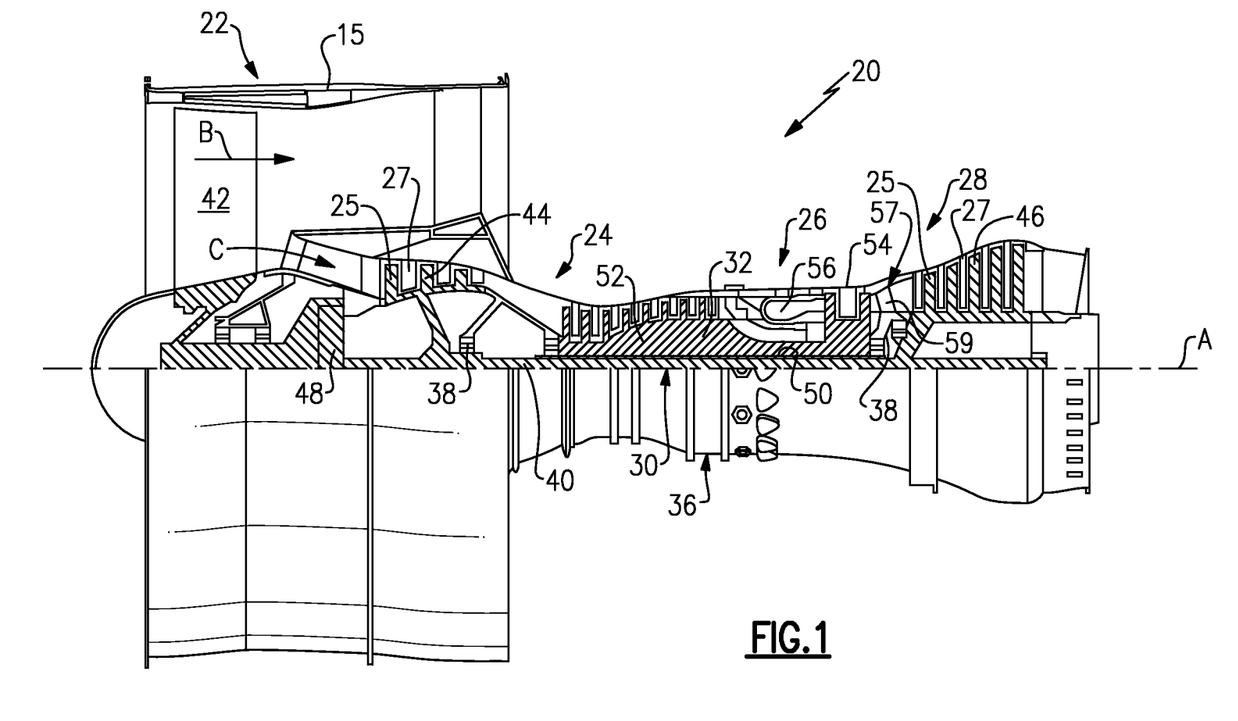
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1200 ft/second (365.7 meters/second).

The disclosed serpentine cooling passage may be used in various gas turbine engine components. For exemplary purposes, a turbine blade 64 is described. It should be understood that the cooling passage may also be used in vanes, blade outer air seals, and turbine platforms, for example.

Figure 2A:
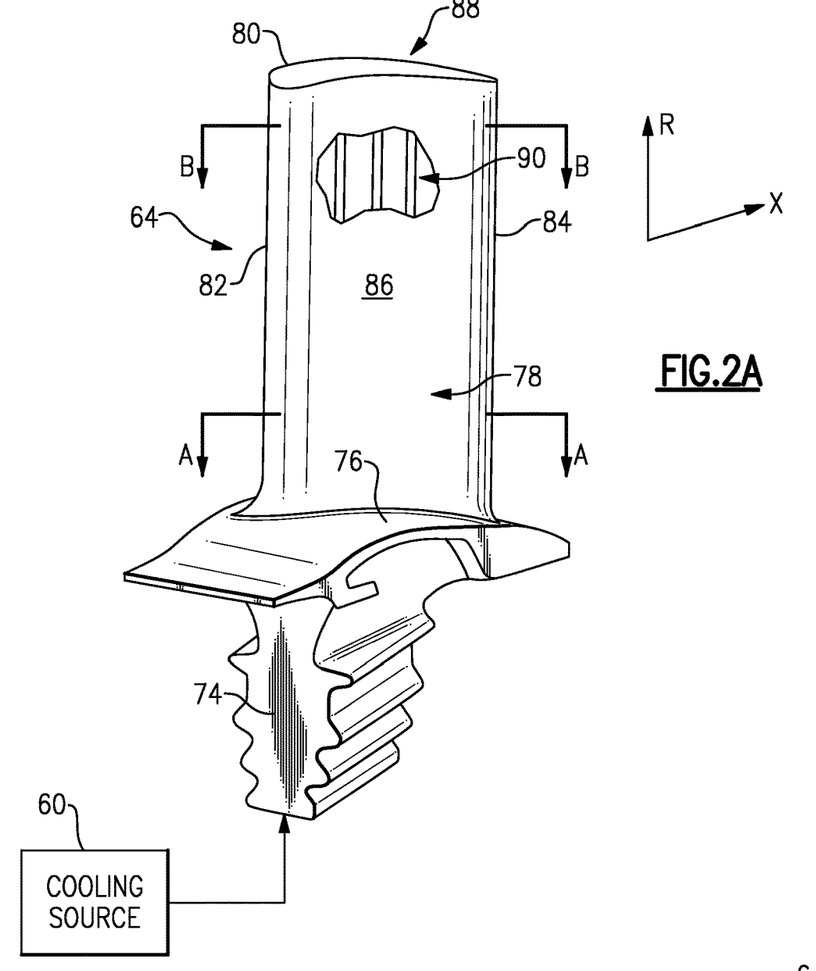
FIG. 2A is a perspective view of the airfoil having the disclosed cooling passage.
Figure 2B:
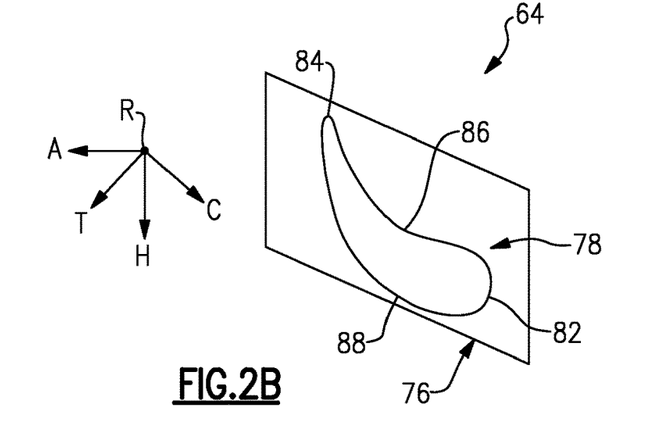
FIG. 2B is a plan view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction C from a leading edge 82 to a trailing edge 84. The airfoil 78 is provided between pressure (typically concave) and suction (typically convex) wall 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction walls 86, 88. The exterior airfoil surface may include multiple film cooling holes (not shown) in fluid communication with the cooling passage 90.

Figure 3:
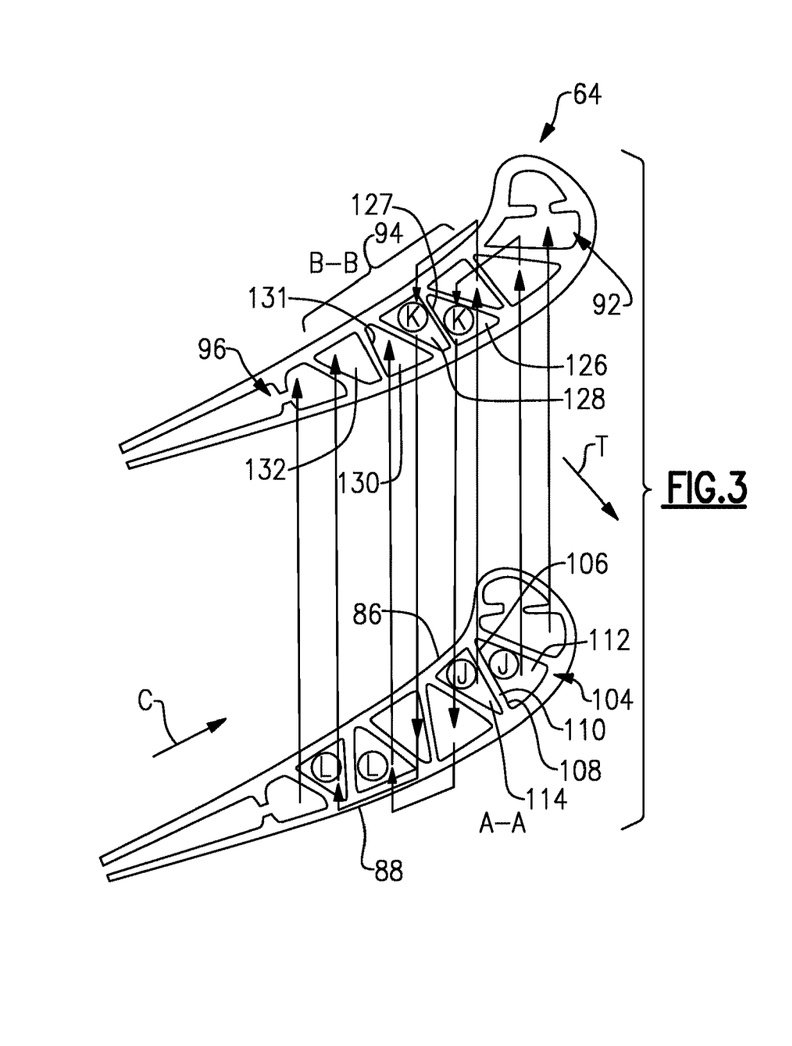
FIG. 3 is a schematic view illustrating sections A-A and B-B of the airfoil shown in FIG. 2A relative to the cooling flow passages shown in FIG. 4.
Figure 4:
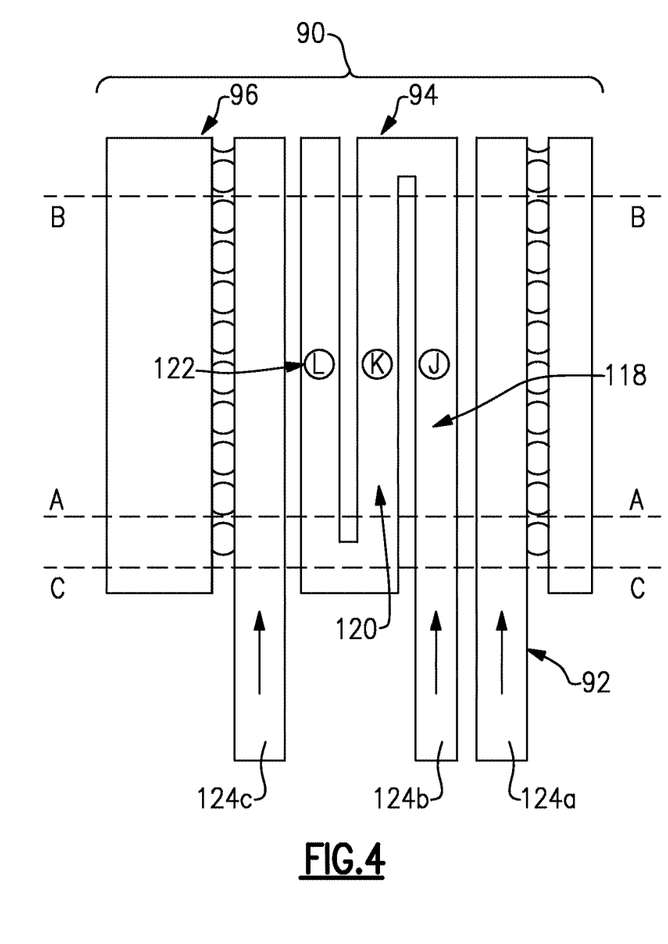
FIG. 4 is a schematic plan view of the cooling passages shown in FIG. 3.
Figure 5:
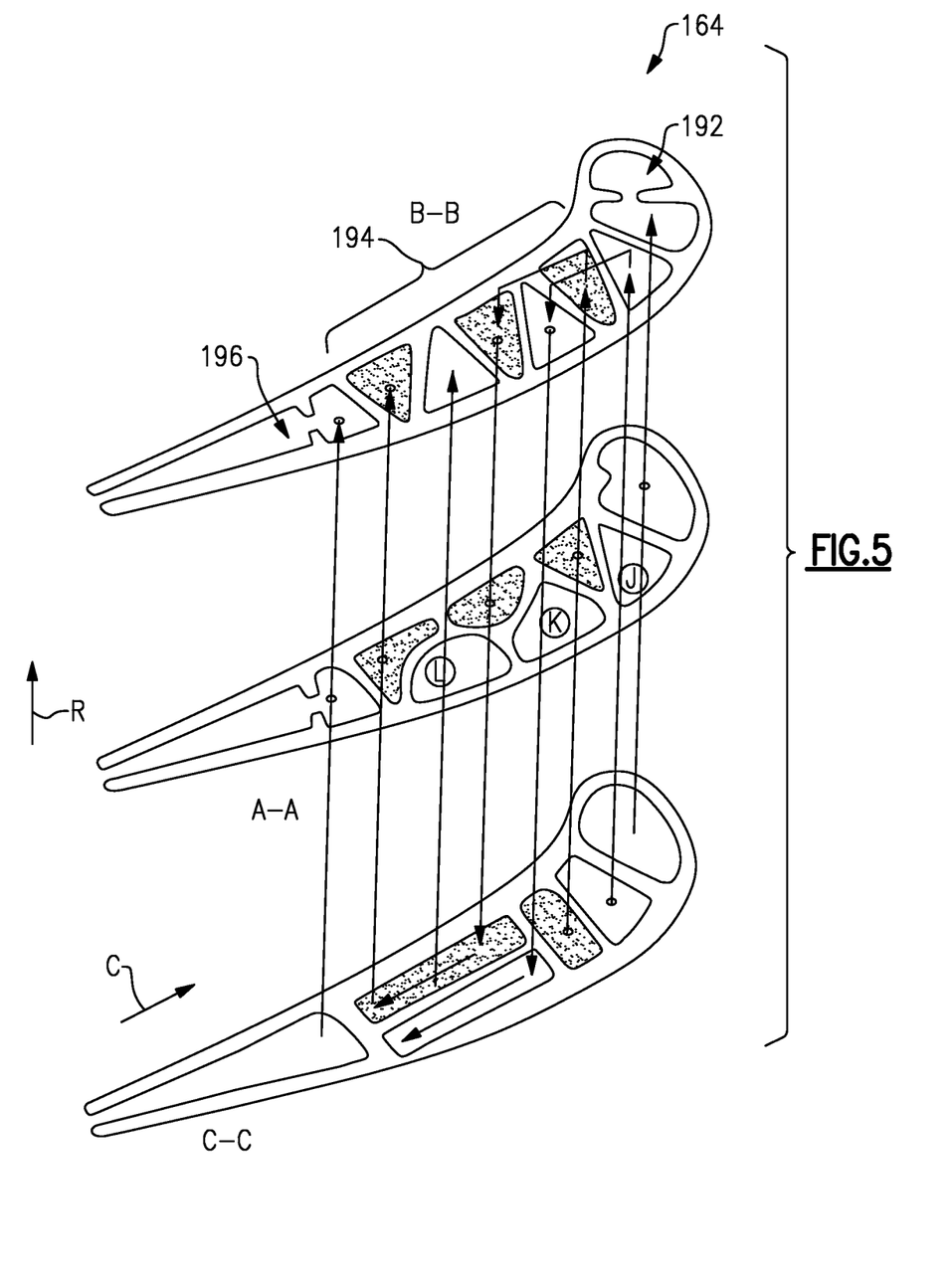
FIG. 5 is a schematic view of sections A-A, B-B and C-C of another example airfoil relative to the cooling flow passages shown in FIG. 4.

Flow through the cooling passage 90 illustrated in FIG. 2A is shown in more detail in FIG. 4. Example cross-sectional views relating to FIG. 4 are shown in FIGS. 3 and 5. One example cooling passage 90 is shown in FIG. 4 and is provided by first, second and third passageways 92, 94, 96, which respectively correspond to leading edge, serpentine and trailing edge passageways. The first and third passageways 92, 96 are fed cooling fluid from a cooling source 60 (FIG. 2A) through inlets 124a, 124c, respectively.

The second passageway 94 includes at least two passes that provide fluid flow in opposite directions from one another. In the example, the second passageway 94 is provided by a three pass configuration having first, second and third passes J-J, K-K, L-L (respectively corresponding to 118, 120, 122). However, it should be understood that other cooling passage configurations may be provided other than shown, for example, three or more passes. In the example, the second pass K-K (a "down" pass) is fluidly connected between the and third passes J-J, L-L ("up" passes). Fluid from the cooling source 60 (FIG. 2A), is provided to the fir-st-second pass K-K through an inlet 124b in the root 74.

At least one of the passes includes nested portions in a chord-wise cross-sectional portion of the airfoil 78. In particular, a pass includes first and second portions 112, 114 nested relative to one another and overlapping in a thickness direction T. The first and second portions 112, 114 are arranged adjacent to one another by sharing a common wall 110. The first portion 112 is provided on the suction side 88, and the second portion 114 is provided on the pressure side 86.

The above-described nested portions can be used for any one pass, or all passes, of the serpentine passageway. For example, the second pass 120 includes third and fourth portions 126, 128 nested relative to one another and overlapping in a thickness direction T. The third and fourth portions 126, 128 are arranged adjacent to one another by sharing a common wall 127. The third portion 126 is provided on the suction side 88, and the fourth portion 128 is provided on the pressure side 86. The third pass 122 includes fifth and sixth portions 130, 132 nested relative to one another and overlapping in a thickness direction T. The fifth and sixth portions 130, 132 are arranged adjacent to one another by sharing a common wall 131. The fifth portion 130 is provided on the suction side 88, and the sixth portion 132 is provided on the pressure side 86.

In the example, each portion of each pass provides a generally quadrilaterally shaped region 104, which includes opposing corners 106, 108. In the example, this quadrilateral-shaped region 104 is separated by the radially extending diagonal wall 110 joining the corners 106, 108 to provide generally triangular-shaped regions 112, 114. The walls, 110, 127, 131 provide a truss-style cross-sectional rib arrangement that increases structural rigidity, particularly in torsion, while minimizing weight. The triangular regions, which are generally non-quadrilaterally shaped in the chord-wise direction, enable nesting and improved heat transfer. A greater surface area to flow area ratio can be achieved in a triangular channel versus a square channel (e.g. by a factor of $\sqrt{3}$~1.73 for equilateral triangles as compared to generally square).

Typically, one serpentine core portion is used to provide the second passage 94. In the example, a pair of core portions are nested relative to one another, with a core portion provided on each of the pressure and suction sides. The core portions may be discrete from one another or joined at one or more locations for improved structural integrity during the manufacturing process.

Versus a traditional full-thickness serpentine, each pressure and suction side serpentine circuit isolates its cooling function to serve just the pressure or the suction side of the airfoil, allowing greater freedom in cavity and flow sizing to most efficiently meet cooling needs. By independent arrangement of the directionality of the cooling flows in each passage, it is possible to increase or decrease heat exchanger effectiveness through tuning adjacent-passage temperature differentials and counter versus co-current flow. Coriolis effects in blades created by their revolution about the rotor axis encourage rotation in the channel flows, aiding filling of the acute angles. The nested arrangement increases wall and rib thickness casting process capability through added shape interaction. Double serpentine design increases damage tolerance by divorcing pressure and suction side cooling circuits. Exposure (via foreign object damage, burn-through, etc.) of one circuit will have smaller depressurization effect on opposite circuit than were there one larger serpentine circuit.

Referring to FIG. 5, another example cooling passage is shown in the airfoil 164, which includes first, second and third passageways 192, 194, 196. The cooling configuration shown in FIG. 5 illustrates that the shapes of the portions may change along the radial direction R. Moreover, the cross-sectional shape of the portions in the chord-wise direction may be any suitable shape, for example, semi-circular or another shape.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A component for a gas turbine engine comprising:
pressure and suction walls that together provide an exterior surface and respectively provide pressure and suction sides, a cooling passage in the component includes a serpentine passageway having first and second passes respectively configured to provide fluid flow in opposite directions from one another, the first pass includes first and second portions nested relative to one another and overlapping in a thickness direction, the first portion extends to both of and is at least partially defined by the pressure and suction walls, the second portion extends to both of and is at least partially defined by the pressure and suction walls, the first and second portions adjacent to one another by sharing a common wall that extends to both of the pressure and suction walls, the first portion provided more substantially on the suction side than the pressure side, and the second portion provided more substantially on the pressure side than the suction side.

2. The component according to claim 1, wherein the serpentine passageway includes at least three passes that includes a third pass, the second pass fluidly connected between the first and third passes, the first pass providing any one of the at least three passes.

3. The component according to claim 2, wherein the second pass includes third and fourth portions nested relative to one another and overlapping in a thickness direction, the third and fourth portions adjacent to one another by sharing a common wall, the third portion provided on the suction side, and the fourth portion provided on the pressure side.

4. The component according to claim 3, wherein the third pass includes fifth and sixth portions nested relative to one another and overlapping in a thickness direction, the fifth and sixth portions adjacent to one another by sharing a common wall, the fifth portion provided on the suction side, and the sixth portion provided on the pressure side.

5. The component according to claim 2, wherein the first pass is an up pass from a root toward an airfoil tip.

6. The component according to claim 5, wherein the serpentine passageway is a three pass configuration.

7. The component according to claim 1, wherein the first and second portions are non-quadrilaterally shaped in a chord-wise direction.

8. The component according to claim 1, wherein the first and second portions are substantially triangularly shaped in a chord-wise direction.

9. A gas turbine engine comprising:
compressor and turbine sections; and
an airfoil provided in one of the compressor and turbine sections, the airfoil including pressure and suction walls that together provide an exterior surface and respectively provide pressure and suction sides, a cooling passage in the airfoil includes a serpentine passageway having first and second passes respectively configured to provide fluid flow in opposite directions from one another, the first pass includes first and second portions nested relative to one another and overlapping in a thickness direction, the first portion extends to both of and is at least partially defined by the pressure and suction walls, the second portion extends to both of and is at least partially defined by the pressure and suction walls, the first and second portions adjacent to one another by sharing a common wall that extends to both of the pressure and suction walls, the first portion provided more substantially on the suction side than the pressure side, and the second portion provided more substantially on the pressure side than the suction side.

10. The gas turbine engine according to claim 9, wherein the serpentine passageway includes at least three passes that includes a third pass, the second pass fluidly connected between the first and third passes, the first pass providing any one of the at least three passes.

11. The gas turbine engine according to claim 10, wherein the second pass includes third and fourth portions nested relative to one another and overlapping in a thickness direction, the third and fourth portions adjacent to one another by sharing a common wall, the third portion provided on the suction side, and the fourth portion provided on the pressure side.

12. The gas turbine engine according to claim 11, wherein the third pass includes fifth and sixth portions nested relative to one another and overlapping in a thickness direction, the fifth and sixth portions adjacent to one another by sharing a common wall, the fifth portion provided on the suction side, and the sixth portion provided on the pressure side.

13. The gas turbine engine according to claim 10, wherein the first pass is an up pass from a root toward an airfoil tip.

14. The gas turbine engine according to claim 13, wherein the serpentine passageway is a three pass configuration.

15. The gas turbine engine according to claim 9, wherein the first and second portions are non-quadrilaterally shaped in a chord-wise direction.

16. The gas turbine engine according to claim 9, wherein the first and second portions are substantially triangularly shaped in a chord-wise direction.

17. The gas turbine engine according to claim 9, wherein the airfoil is provided in the turbine section.

18. The gas turbine engine according to claim 17, wherein the airfoil is a turbine blade.

* * * * *